United States Patent [19]

Fuderer

[11] 4,442,020

[45] * Apr. 10, 1984

[54] CATALYTIC STEAM REFORMING OF HYDROCARBONS

[75] Inventor: Andrija Fuderer, Antwerpen, Belgium

[73] Assignee: Union Carbide Corporation, Danbury, Conn.

[ * ] Notice: The portion of the term of this patent subsequent to Jun. 29, 1999 has been disclaimed.

[21] Appl. No.: 384,581

[22] Filed: Jun. 3, 1982

Related U.S. Application Data

[62] Division of Ser. No. 114,566, Jan. 23, 1980, Pat. No. 4,337,170.

[51] Int. Cl.$^3$ .............................................. C01B 3/38
[52] U.S. Cl. .................................................... 252/373
[58] Field of Search ......... 252/373; 48/214 R, 214 A, 48/197 R

[56] References Cited

U.S. PATENT DOCUMENTS

| | | |
|---|---|---|
| Re. 26,990 | 11/1970 | Bongiorno . |
| 2,519,696 | 8/1950 | Ore . |
| 3,262,758 | 7/1966 | James et al. . |
| 3,264,066 | 8/1966 | Quartulli et al. . |
| 3,278,452 | 10/1966 | Vorum . |
| 3,607,125 | 9/1971 | Kydd . |
| 3,910,768 | 10/1975 | Woebeke et al. . |
| 4,079,017 | 3/1978 | Crawford et al. . |
| 4,337,170 | 6/1982 | Fuderer ................................ 252/373 |

*Primary Examiner*—Howard T. Mars
*Attorney, Agent, or Firm*—Alvin H. Fritschler

[57] ABSTRACT

The hot effluent from the catalytic steam reforming of a major portion of a fluid hydrocarbon feed stream in the reformer tubes of a primary reformer, or said effluent after secondary reforming thereof, is mixed with the hot effluent from the catalytic steam reforming of the remaining portion of the feed discharged from the reformer tubes of a primary reformer-exchanger. The combined gas stream is passed on the shell side of the reformer-exchanger countercurrently to the passage of feed in the reformer tubes thereof, thus supplying the heat for the reforming of the portion of the feed passed through the reformer tubes of the reformer-exchanger. At least about ⅔ of the hydrocarbon feed stream is passed to the reformer tubes of said primary reformer, heated by radiant heat transfer and/or by contact with combustion gases, at a steam/hydrocarbon mole ratio of about 2–4/1. The remainder of said feed stream is passed to the reformer tubes of said reformer-exchanger at a steam/hydrocarbon mole ratio of about 3–6/1. The reformer shell of the reformer-exchanger is internally insulated by a refractory lining or by use of a double shell with passage of water or a portion of the feed material between the inner and outer shells. There is no significant difference between the pressure inside and outside of the reformer tubes of said primary reformer-exchanger.

9 Claims, 1 Drawing Figure

U.S. Patent  Apr. 10, 1984  4,442,020
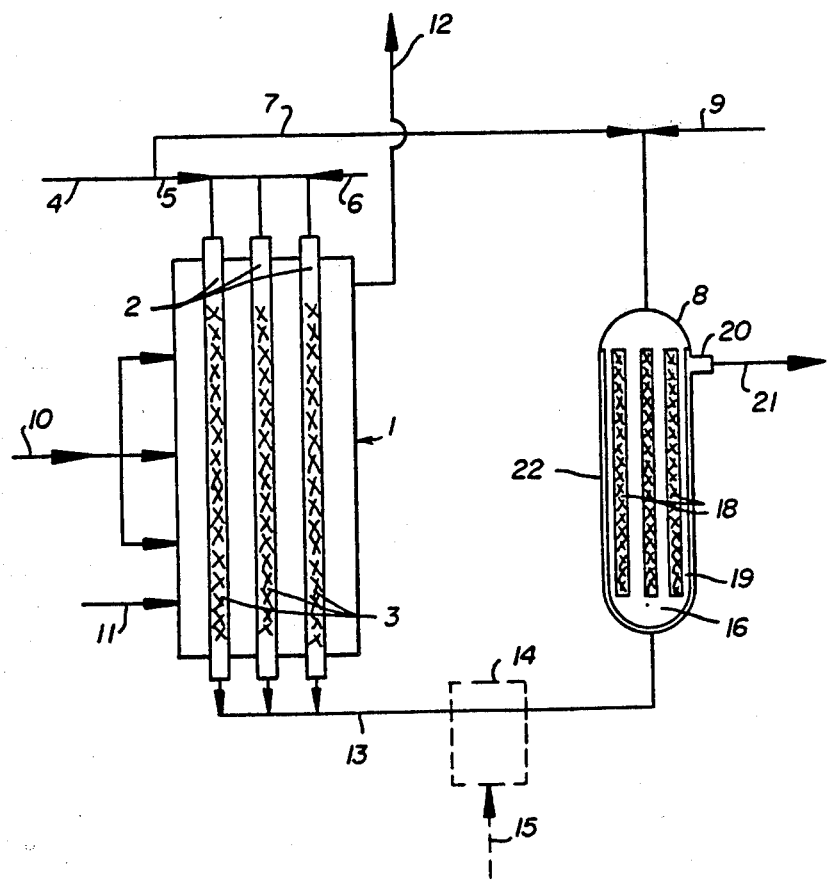

CATALYTIC STEAM REFORMING OF HYDROCARBONS

This application is a division of our prior U.S. application: Ser. No. 114,566 filed Jan. 23, 1980, now U.S. Pat. No. 4,337,170.

BACKGROUND OF THE INVENTION

1. Field of the Invention

The invention relates to the steam reforming of fluid hydrocarbons. More particularly, it relates to an improved process and apparatus for reducing the fuel consumption and waste heat requirements of steam reforming operations.

2. Description of the Prior Art

In conventional steam reforming of fluid hydrocarbons, the feed material is conveniently passed through catalyst-containing vertically hanging reformer tubes maintained at an elevated temperature by radiant heat transfer and/or by contact with combustion gases in the furnace of the tubular reactor. The hot reformer tube effluent may be passed to a waste heat recovery zone for the generation of steam that can be used in the steam reforming operations.

Such conventional operations are commonly carried out at temperatures of from about 800° C. to about 900° C. with a mole ratio of steam to hydrocarbon feed of from about 2/1 to about 4/1. While such operations have been effectively carried out in practical commercial operations, there is a genuine need in the art for improved processes and apparatus to reduce the fuel consumption and waste heat requirements of steam reforming operations and to reduce the capital investment costs of such operations. This need is particularly acute in light of the rapidly increasing cost of fuel employed in such operations.

Various processing techniques and apparatus have, of course, been disclosed in the art with respect to hydrocarbon reforming and cracking operations. For example, the Bongiorno patent, U.S. Pat. No. Re. 24,311, discloses conventional steam reforming with the use of the exhaust gas from the gas turbine used to compress the product synthesis gas as a combustion-supporting gas to heat the primary reformer furnace that produces the synthesis gas. Orr, U.S. Pat. No. 2,519,696, discloses a horizontally oriented tube cracking furnace in which gases to be cracked pass through and are preheated in horizontal tubes and exit therefrom into direct contact with hot combustion gases. The resulting gas stream passes through cracking tubes countercurrently to the feed gases. The invention is said to provide a maximum thermal heat exchange relationship in which the gases to be cracked are preheated before being subject to reaction heat conditions, with the incoming feed likewise cooling the reaction mixture so as to prevent undesirable side reactions. With respect to high pressure cracking operations, Woebcke et al, U.S. Pat. No. 3,910,768, teaches the desirability of permitting the process fluid and the combustion gas to operate at essentially the same pressure, thereby relieving the pressure differential on the reactor tubes. Hanging reactor tubes are provided in the convection section with processing fluids passing downward therein countercurrent to the upward flow of flue gas.

A heat exchanger-tubular steam reformer is disclosed by Kydd, U.S. Pat. No. 3,607,125, in which process gas passes downwardly through an annular, catalyst-filled space between a metal liner and a centrally located product tube and thereafter rises upward in said tube. The reactor tube is hung vertically with the thermal stress thereon being minimized since the lower end by the tube is not connected to any supporting structure. Kydd discloses that the direction of process flow through the apparatus can be reversed, with the process gas entering the centrally located hanging tube and exiting, after passage downward through the catalyst, in an upward direction along the annular space between the tube and the wall of the apparatus.

Such prior art developments illustrate the desire to effectively utilize the available waste heat from reforming and cracking operations and to reduce the fuel requirements of such operations. There remains a need for further developments of this type, however, particularly to reduce the need for waste heat recovery, as by steam generation, in applications in which there is little need for export steam.

It is an object of the present invention, therefore, to provide an improved process and apparatus for the steam reforming of fluid hydrocarbons.

It is another object of the invention to provide a steam reforming process and apparatus capable of permitting desirable reductions in the fuel consumption and waste heat requirements of such reforming operations.

It is a further object of the invention to provide for the effective utilization of the heat generated in the steam reforming of fluid hydrocarbons.

With these and other objects in mind, the invention is hereinafter described with reference to particular embodiments thereof, the novel features of which are particularly pointed out in the appended claims.

SUMMARY OF THE INVENTION

The fluid hydrocarbon feed stream to a steam reforming operation is divided into two streams, with a major portion thereof passing to a conventional primary tubular reformer and with the hot reformer tube effluent therefrom being used to supply heat for the reforming of the remaining portion of the feed in a primary reformer-exchanger unit. For this purpose, said hot effluent is combined with the hot reformed gas passing from the primary reformer tubes of the reformer-exchanger unit, and the combined hot reformer gas stream is passed on the shell side of said exchanger-reformer unit countercurrently to the flow of feed material in the reformer tubes of said unit. Alternately, the hot effluent from the conventional primary reformer can be passed to a secondary reforming zone with the effluent from said secondary zone being combined with said hot reformed gas from the primary reformer-exchanger unit. By such process and apparatus, the fuel consumption requirements of the overall steam reforming operation are substantially reduced and the recoverable waste heat in the overall reformer effluent is likewise reduced as compared with conventional tubular reforming of hydrocarbon feed streams. Thus, less export steam is produced for use outside the reforming operation. In larger size plants, the capital investment costs for the steam reforming operation can be reduced. The reformer-exchanger portion of the overall reforming apparatus is advantageously an internally insulated reformer-exchanger unit in which the inner wall of the shell side of said reformer-exchanger can be lined with refractory material or in which a double shell configuration can be employed with means for passing water or a portion of the feed material between the inner and outer shells of said reformer-exchanger unit.

BRIEF DESCRIPTION OF THE DRAWINGS

The invention is hereinafter described with reference to the accompanying drawing illustrating the process flow and apparatus employed in the practice of the invention.

DETAILED DESCRIPTION OF THE INVENTION

The invention enhances the overall technical-economical feasibility of steam reforming operations. The objects of the invention are accomplished by dividing a fluid hydrocarbon stream into two portions, one of which is subjected to conventional steam reforming with the hot effluent therefrom supplying heat for the reforming of the remainder of said stream in a novel reformer-exchanger system as described herein. The fuel consumption requirements for steam reforming operations are thereby significantly improved. The waste heat requirements of such operations are also significantly reduced, providing an advantage that is particularly significant in applications in which there is little or no need for export steam. The invention thus achieves appreciable savings in operating costs compared to conventional operations. In particular embodiments, usually in larger size applications, such savings are accompanied by investment cost savings that further enhance the overall desirability of the invention for practical commerical steam reforming operations.

The catalytic conversion of hydrocarbons by reaction with steam at elevated temperature is, of course, well known in the art. In this process, a fluid hydrocarbon, such as natural gas, is converted to a hot reformed gas mixture containing principally hydrogen and carbon monoxide according to the reaction:

$$CH_4 + H_2O \rightarrow CO + 3H_2,$$

known generally as primary reforming and widely used in the production of synthesis gas or pure hydrogen. The primary reforming reaction is endothermic in nature, and the conventional operation is usually carried out by passing a gaseous mixture of fluid hydrocarbon and steam through an externally heated reaction tube or group of tubes. The tubes are packed with a suitable catalyst composition, such as solid catalyst granules deposited on an inert carrier material. The resulting reformed gas mixture discharges from said tubes as a hot reformer tube effluent from which heat may be recovered in a waste heat recovery zone. The hot reformer tube effluent from primary steam reforming is often passed, however, directly to a secondary reforming zone in which the reformed gas mixture is passed, together with oxygen or air, through a bed of the reforming catalyst so that said oxygen or air reacts with unconverted methane present in the reformed gas mixture. The gas mixture from such secondary reforming can then be cooled in said waste heat recovery zone prior to further processing.

Such conventional processing is employed in the practice of the present invention for the treatment of a major portion of the fluid hydrocarbon feed stream being passed to a steam reforming operation. The heat required for such conventional primary reforming is usually supplied by burning a fluid hydrocarbon fuel with air in the primary reforming zone external to the catalyst-filled reformer tubes positioned therein. The reformer tubes are thus heated and maintained at an elevated temperature by radiant heat transfer and/or by contact with the hot combustion gases produced by such burning of hydrocarbon fuel.

In accordance with the present invention, the remaining portion of the fluid hydrocarbon feed stream is catalytically reacted with steam at an elevated temperature in a second primary reforming zone that likewise has catalyst-containing reformer tubes positioned therein. The hot effluent from said reformer tubes comprises a hot reformed gas mixture that is combined with the hot reformed gas mixture from conventional primary reforming, or from the secondary reforming thereof. The heat content of the combined gas stream is employed to supply heat to maintain the second primary reforming zone at an elevated temperature as further described with reference to the illustrated embodiment of the reformer-exchanger system and overall steam reforming apparatus and process flow shown in the drawing.

The conventional primary reforming zone of the invention is represented in the drawings by the numeral 1. Vertically oriented reformer tubes 2 are positioned therein, said tubes each containing catalyst beds 3 comprising a suitable reforming catalyst material. The fluid hydrocarbon feed stream in line 4 is divided into two streams, with a major portion of the feed stream passing in line 5 to said primary reforming zone 1 together with steam shown as being introduced through line 6 for mixing with said fluid hydrocarbon feed stream in said line 5. The remaining portion of the hydrocarbon feed stream is passed in line 7 to a second primary reforming zone comprising primary reformer-exchanger 8. Steam from line 9 is mixed with said remaining portion of the hydrocarbon feed steam thus being fed to said reformer-exchanger 8. A fluid hydrocarbon fuel, such as a side stream from the fluid hydrocarbon feed stream 4, is passed through line 10 to the shell side of primary reforming zone 1 for burning therein, as with air shown generally as being fed to said zone 1 through line 11. Flue gas is removed from zone 1 through line 12. Hot reformer tube effluent comprising a reformed gas mixture, upon exiting from reformer tubes 2 in said primary reforming zone or unit 1, is passed through line 13 to primary reformer-exchange 8 for the utilization of the heat content of said hot effluent therein. In accordance with conventional practice, it is within the scope of the invention to pass the effluent from primary reforming directly to a secondary reforming zone as noted above. In the drawing, therefore, secondary reforming zone 14 is shown as an optional unit in said line 13 between primary reformer 1 and reformer-exchanger 8. Line 15 to said secondary reformer 14 is to supply air or oxygen for reaction with unconverted methane present in the reformed gas mixture from primary reformer 1.

The hot effluent from primary reformer 1, or said effluent after passing through secondary reformer 14, is passed through said line 13 to the hot discharge end 16 of reformer tubes 17 in reformer-exchanger 8. In said hot discharge end, said hot effluent from conventional reforming is combined with the hot effluent from said reformer tubes 17, said latter hot effluent comprising a reformed gas mixture formed upon passage of remaining portion 7 of the hydrocarbon feed stream and steam from line 9 through said reformer tubes 17 containing catalyst beds 18 therein. The heat to maintain reformer-exchanger 8, and catalyst-containing reformer tubes 17 therein, at an elevated temperature for the catalyst reaction of said hydrocarbon feed stream and steam is supplied by passing the hot combined effluent streams comprising a hot combined reformer gas stream countercurrently on the shell side 19 of said reformer-exchanger 8. In thus supplying heat to the reaction mixture within said reformer tubes 17, the combined reformer gas stream is partially cooled and is withdrawn from the hot discharge end 20 of said reformer-exchanger 8, that comprises the second primary reaction zone of the overall system, through hot discharge line 21 as a reformed gas product stream. This product stream can be passed through a conventional waste heat recovery zone, not shown, for further cooling, as by the production of export steam, prior to further conventional treatment or use, as for example in the production of pure hydrogen from said combined reformed gas mixture. Reformer-exchanger 8, thus employed to effectively utilize the available heat of the conventional reforming effluent stream, and of the hot effluent from the reformer tubes of said reformer-exchanger itself, is desirably internally insulated as by lining 22 with a suitable refractory material.

The term "fluid hydrocarbon," as used herein, is intended to include not only normally gaseous hydrocarbons, such as natural gas, propane and butane, but also pre-vaporized normally liquid hydrocarbons, such as hexane or petroleum refining low-boiling fractions such as naphtha. It will also be understood by those skilled in the art that the catalyst employed in the practice of the invention can be any one or more suitable reforming catalysts employed in convention steam reforming operations. The metals of Group VIII of the Periodic System having an atomic number not greater than 28 and/or oxides thereof and metals of the left-hand elements of Group VI and/or oxides thereof are known reforming catalysts. Specific examples of reforming catalysts that can be used are nickel, nickel oxide, cobalt oxide, chromia and molybdenum oxide. The catalyst can be employed with promoters and can have been subjected to various special treatments known in the art for purposes of enhancing its properties. The composition and method of preparation of the catalyst composition for use in the invention form no part of the novel features of the invention and, therefore, are not further described herein. Generally, however, promoted nickel oxide catalysts are preferred, and the primary reformer tubes of the reformer zones are packed with solid catalyst granules, usually comprising such nickel or other catalytic agent deposited on a suitable inert carrier material. As secondary reforming is also a catalytic process, the hot reformer tube effluent is commonly passed through a stationary bed of such reforming catalyst in those embodiments in which secondary reforming of the effluent from conventional primary reforming is employed.

The conditions employed in the primary steam reforming operations of the invention are those serving to promote substantial conversion of the fluid hydrocarbon feed stream to hydrogen and carbon monoxide. Thus, the hot reformer tube effluent from the conventional tubular reformer, i.e. primary reforming zone 1 of the drawing, is at a temperature of from about 800° C. to about 900° C. As the heat content of said hot effluent is used to maintain the temperature in the reformer-exchanger unit, the temperature of the hot effluent from the reformer tubes of said reformer-exchanger, i.e. reformer-exchanger unit 8 of the drawing, tends to be somewhat less than in zone 1, being commonly on the order of from about 700° C. to about 860° C. The partially cooled combined reformer gas stream withdrawn from the reformer-exchanger unit will commonly be at a temperature of from about 400° C. to about 600° C. When secondary reforming of the reformed gas mixture from primary reformer 1 is employed, the partial combustion reaction therein tends to increase the temperature of the gas mixture, so that the hot effluent from the secondary reforming zone will commonly be at a temperature of from about 900° C. to about 1200° C.

Both the fluid hydrocarbon feed stream and the steam applied to the reforming operation of the invention are, consistent with conventional practice, preferably preheated prior to entering the primary reforming zones. The hydrocarbon feedstock is preheated up to as high a temperature as is consistent with the avoiding of undesired pyrolysis or other heat deterioration. Since steam reforming is endothermic in nature and since there are practical limits to the amount of heat that can be added by indirect heating in the reforming zones, preheating of the feed facilitates attainment and maintenance of suitable temperature therein. It is commonly preferred to preheat both the hydrocarbon feed and the steam to a temperature of at least 400° C. As indicated above, the portion of the hydrocarbon feed passed to a conventional tubular reformer, together with steam, contacts a steam reforming catalyst preferably disposed in a plurality of furnace tubes that are disposed so as to be maintained at an elevated temperature by radiant heat transfer and/or by contact with combustion gases. Fuel, such as a portion of the hydrocarbon feed, is burned in the reformer furnace to externally heat the reformer tubes and to supply the endothermic heat of reforming consumed therein. In the reformer-exchanger employed for the steam reforming of the remainder of the hydrocarbon feed, the heat content of the combined reformer gas stream is employed to supply the endothermic heat of reaction for the reformer-exchanger unit.

The ratio of steam to hydrocarbon feed will vary, as is know in the art, depending on the overall conditions employed in each primary reforming zone. The amount of steam employed is influenced by the requirement of avoiding carbon deposition on the catalyst and by the acceptable methane content of the effluent at the reforming conditions maintained. On this basis, the mole ratio of steam to hydrocarbon feed in the conventional primary reformer unit is preferably from about 2/1 to about 4/1, while the mole ratio in the primary reformer-exchanger unit is preferably from about 3/1 to about 6/1. The higher amounts of steam commonly employed in the reformer-exchanger unit are, at least in part, to compensate for the generally lower reaction temperature maintained in the reaction tubes of the reformer-exchanger than pertains in the reactor tubes of the conventional tubular reformer.

It will be appreciated that steam reforming operations, including those of the present invention, are commonly carried out at superatmospheric pressure. The specific operating pressure employed is influenced by the pressure requirements of the subsequent process in which the reformed gas mixture or hydrogen is to be employed. Although any superatmospheric pressure can be used in practicing the invention, pressures of from about 350 to about 700 p.s.i.g. are commonly employed, although pressures of from about 175 to about 300 p.s.i.g., below 175 p.s.i.g., and up to as high as 1,000 p.s.i.g. can be maintained in particular embodiments of the invention.

The present invention is carried out by catalytically reacting a major portion of the fluid hydrocarbon feed stream with steam in a conventional tubular reformer, catalytically reacting the remaining portion of said hydrocarbon feed stream with steam in the reformer-exchanger portion of the overall process and apparatus herein described and claimed, and utilizing the hot combined reformer gas stream to supply heat to maintain the elevated temperature employed in the reformer-exchanger unit. Those skilled in the art will appreciate that the precise amount of the overall hydrocarbon feed passed to each of said primary reforming zones will depend upon the particular conditions applicable in any given application, including the nature of the hydrocarbon feed, the catalyst employed, the steam/hydrocarbon ratio, the temperature and pressure of the reaction and the like. In general, however, said major portion of the hydrocarbon feed thus passed to the conventional primary reformer will generally comprise at least about two-thirds of the overall hydrocarbon feed stream. In preferred embodiments, said major portion of the hydrocarbon feed will comprise from about 70% to about 80% by volume based on the overall hydrocarbon feed to the stream reforming operations of the invention.

In the illustration of the drawing, both primary reformer 1 and reformer-exchanger 8 are shown with vertically oriented tubes although it will be appreciated that horizontally oriented tubes can also be employed in the practice of the invention. The use of hanging tubes is particularly desirable in the reformer-exchanger unit as the hot effluent from the hanging reformer tubes, following steam reforming during downward passage of the steam-hydrocarbon mixture in the hanging tubes, can conveniently be combined with the hot reformer tube effluent from conventional reforming at the hot discharge end of said hanging reforming tubes in the lower portion of reformer-exchanger 8. The combined reformer gas stream thus formed is thereupon passed upward on the shell side of the reformer-exchanger, countercurrently to the flow of the reaction mixture in the reformer tubes, to provide the necessary heat to maintain the elevated temperature in the reformer tubes. As the pressure inside and outside the hanging tubes is essentially the same, tube rupture is avoided without the necessity for incurring undue costs in this regard. For preferred operation, the primary reformer-exchanger unit comprises an internally insulated reformer-exchanger unit or zone. For this purpose, the inner wall of the shell side of the reformer-exchanger can be lined with MgO or other convenient refractory material so as to protect the outer shell of the unit and to effectively utilize the available heat of the combined reformer effluent stream. Alternately, the internally insulated reformer-exchanger unit can comprise a double shell unit with means for passing water or a portion of the feed material, or other coolant fluid between the inner and outer shells of said reformer-exchanger unit.

The partially cooled combined reformer effluent stream withdrawn from the reformer-exchanger unit is desirably passed to a conventional waste heat recovery zone for the recovery of at least a portion of its remaining heat content prior to further downstream processing or use. The heat content of said partially cooled stream can be used for the generation of steam, for example, with said steam being conveniently employed as process steam for the catalytic steam reforming operations of the invention. Because of the effective use of the heat content of the combined reformer gas stream in the reformer-exchanger, the amount of steam recovered in the waste heat recovery zone is significantly less than is recovered in conventional operations. Because of the generally higher steam requirements of the reformer-exchanger as compared with the higher temperature, conventional primary tubular reformer, the amount of excess or export steam to be withdrawn from the overall reforming operation is thus considerably less than the amount of export steam generated in conventional reforming operations. This is an important advantage where there is little or no need for such export steam, as where other, lower cost steam is available in the facilities of which the reforming operations are a part. It will also be appreciated by those skilled in the art that, in some embodiments of the invention, there might accurately be a deficiency of steam generated in the practice of the invention, so that low cost steam generated outside the process of the invention is imported for use therein. Again, this constitutes an important advantage of the invention in applications where there is no need for export steam from the steam reforming operations.

The invention is further described with reference to particular embodiments illustrated by the following examples.

EXAMPLE 1

In a steaming reforming operation to produce a reformed gas mixture for the production of $1.06 \times 10^6$ SCF (Standard Cubic Feed) of hydrogen/hour based on plant operations of 8,000 hours/year, naphtha is employed as the hydrocarbon feed material and as the fuel for the conventional primary tubular reformer. By use of the apparatus and process of the present invention, without employment of a secondary reforming unit, appreciable savings in operating costs are achieved as compared with a conventional primary reforming operation of the same capacity using the same fuel/feed material. The hot reformer tube effluent from conventional reforming in a tubular reformer is removed from the reformer tubes thereof at about 830° C. for passage to a boiler or other waste heat recovery zone. The partially cooled combined reformer effluent removed from the reformer-exchanger unit of the invention, on the other hand, is at a temperature of about 650° C., thus appreciably reducing the waste heat requirements as compared to conventional reforming operations. The composition of the reformed gas mixture removed from the reformer-exchanger of the invention is nearly the same as that removed from the corresponding conventional reforming operations. In this embodiment of the invention, about 77% by volume of the overall naphtha feed material is passed to the conventional primary reformer and about 23% is passed to the reformer-exchanger, apart from feed material employed for fuel. The hot reformer tube effluent from the primary reformer portion of the apparatus of the invention is at about 860° C. and is passed directly to the lower portion of the reformer-exchanger for combination with the effluent at the hot discharge end of the reformer tubes thereof. In addition to the reduced steam production resulting from the use of the heat content of the hot combined reformer gas stream in the reformer-exchanger, the fuel consumption in the practice of the invention is also considerably reduced. A reduction in export steam production of 40,455 lbs/hr is achieved by the invention, resulting in a lower credit for export steam of $101.14/hr based on a steam value of $2.50/1000 lbs. The consumption of naphtha fuel is reduced by 2,375 lbs/hr by the practice of the invention resulting in a cost savings of $197.99/hr based on a fuel value of $0.50/gallon or 8.34¢/lb. While the savings in net operating costs by use of the present invention will vary with the values assigned to steam and fuel, it will be seen that the invention achieves a substantial reduction in hydrocarbon fuel consumption in addition to a reduction of recoverable waste heat in the reformer effluent compared with conventional operations. In applications where there is no demand for export steam, therefore, the present invention will always provide a significant savings in operating costs as compared to conventional operations.

The savings in operating cost illustrated above is directly proportional to plant capacity. In addition, it has been determined that, for the same productive capacity, the use of the apparatus of the invention will result in a reduction in the number of tubes in the conventional fired reformer furnace. The flue gas ducts will likewise be reduced, with both such reductions estimated at about 20%. The flue gas fan, combustion air blower and other related equipment can be employed at smaller capacity when the primary reformer is combined with a reformer-exchanger in the practice of the invention. Although the reformer-exchanger unit represents an additional piece of equipment, it should be noted that it replaces a part of the steam producing heat exchange area in the conventional processing arrangement. For these reasons, the savings in investment cost can be quite signficant for units of larger capacity, such as the plant of the illustrative example. This advantage will diminish with smaller capacities, but even at about 1/10 said capacity of the example, the investment costs of the invention will be smaller than, or approximately equal to, the investment cost of the conventional reforming unit.

EXAMPLE 2

In this embodiment, the reformer-exchanger of the invention is employed in the steam reforming of a methane feed to produce a reformed gas mixture that is passed to a conventional CO shift to form additional hydrogen and is thereafter forwarded to a pressure swing adsorption unit for the production of pure hydrogen. For the purpose, 1,000 moles/hour of a methane feed stream at 24 bar, i.e. 348 psia, is heated to 400° C. and desulphurised on a Zn O bed. The feed stream is then divided into two streams, with 770 moles/hour being mixed with 2,080 moles/hour of steam and introduced to the utalytic tube of a directly fired primary steam reformer wherein it is heated to a reaction temperature of 865° C. The remaining portion of the feed stream, i.e. 230 moles/hour of methane, is mixed with 920 moles of steam and introduced to the catalyst tubes of the reformer-exchanger wherein it is heated to a reaction temperature of 770° C. The effluent from the primary reformer is mixed with the effluent at the discharge end of the catalyst tubes of the reformer-exchanger. The resulting hot combined reformer gas stream has a temperature of 840° C. and is cooled to 580° C. sharing its passage on the shell side of reformer-exchanger countercurrently to the passage of the reaction mixture in the catalyst tubes of said reformer-exchanger. The thus-cooled combined reformer effluent exiting from the reformer-exchanger is further cooled to 310° C. and is passed to a conventional CO shift reaction zone in the catalytic bed of which most of the carbon monoxide present in the combined reformer effluent is reacted with steam to form additional hydrogen and carbon dioxide. The effluents from the primary reformers and from the CO shift are summarized in Table 1 as follows:

TABLE 1

| | Direct Fired Reformer | Reformer-Exchanger | Combined Effluent | After CO—Shift |
|---|---|---|---|---|
| Temperature, °C. | 865 | 770 | 840 | 370 |
| Pressure, bar | 20.7 | 20.7 | 20.7 | 20 |
| Moles/hour | | | | |
| $CH_4$ | 138.6 | 66.7 | 205.3 | 205.3 |
| CO | 415.8 | 69 | 484.8 | 130 |
| $CO_2$ | 215.6 | 94.3 | 309.9 | 654.7 |
| $H_2O$ | 1232 | 662.4 | 1894.4 | 1539.6 |
| $H_2$ | 2109.8 | 584.2 | 2694.0 | 3048.8 |
| Total moles/hour | 4111.8 | 1476.6 | 5588.4 | 5588.4 |

Following Co-shift, the process gas is further cooled, and more steam is generated. A total of 1800 kgmol/hour of steam is produced in the process gas coolers. After cooling to ambient temperature, the gas is separated in a pressure swing adsorption unit to 2622 kgmoles/hour of pure hydrogen and a waste gas with a total heat content of 304 GJoule/hour, based on lower heating value. The waste gas is used as fuel for the direct fired reformer.

The heat balance for this illustrative example of the use of the reformer-exchanger of the invention is compared with that of conventional prior art primary steam reforming in Table 2 below.

TABLE 2

| Heat Balance (All values expressed in GJoule/hour) | | |
|---|---|---|
| | Invention | Prior Art |
| Feed Methane* | 800 | 792 |
| Fuel Methane* | 40 | 120 |
| Total-Heat In Feed plus Fuel | 840 | 912 |
| Steam Export (generated-used) | 10 | 75 |
| Heating Value of Product Hydrogen* | 632 | 632 |
| Heat Losses- Stack and Process Gas Cooler | 198 | 205 |
| Total-Heat Chart | 840 | 912 |
| Efficiency, % (Hydrogen only) | 75.2 | 69.3 |
| Efficiency, % (Hydrogen plus steam export) | 76.4 | 77.5 |

*Low Heating Value

It will be appreciated that, frequently, no export steam is needed in the overall processing operation. The Example illustrates that, in the practice of the invention, the desired steam reforming operation is accomplished at a substantial, i.e. 8%, reduction in the feed plus fuel requirements of the steam reforming operation.

EXAMPLE 3

In this illustrative example, 1000 moles/hour of methane feed at 31 bar is divided into two streams, one of which is passed to a conventional primary reformer and then to a secondary reforming zone. The effluent from the secondary zone is combined with the reformed gas mixture discharged at the hot discharge end of the catalyst-containing reformer tubes of the reformer-exchanger to form a combined reformer gas stream that is passed on the shell side of said reformer-exchanger. Thus, 750 moles/hour of methane is mixed with 2025 moles/hour of steam and is heated in the direct fired primary reformer to 815° C. and is thereafter passed to a secondary reformer in which 150 moles/hour of oxygen are added thereto. The outlet temperature of the secondary reforming zone is 940° C. The second portion of the feed material, i.e. 250 moles/hour of methane, is mixed with 1900 moles/hour of steam and is heated in the reformer-exchanger to 840° C. The effluent compositions of the various processing steams are as set forth in Table 3 below.

TABLE 3

|  | Direct Fired Reformer | Secondary Reformer | Reformer-Exchanger | Combined Effluent |
|---|---|---|---|---|
| Temperature, °C. | 815 | 940 | 840 | 916 |
| Pressure, bar | 29 | 28.2 | 28.2 | 28.2 |
| Moles/hour |  |  |  |  |
| $CH_4$ | 270 | 52 | 53 | 105 |
| CO | 263 | 465 | 107 | 572 |
| $CO_2$ | 217 | 233 | 90 | 323 |
| $H_2O$ | 1328 | 1394 | 613 | 2007 |
| $H_2$ | 1657 | 2027 | 678.5 | 2705.5 |
| Total | 3735 | 4171 | 1541.7 | 5712.5 |

In this example, 25% of the feed is being reformed in the reformer-exchanger unit. The reformer tube effluent from the direct fired primary reformer is first passed to a secondary reformer operated with oxygen addition. It will be understood that preheated air can be employed in the secondary reformer instead of oxygen, this modification being particularly advantageous when ammonia syngas is to be produced instead of pure hydrogen. The more oxygen, or air, that is added to the secondary reformer, the larger can be the portion of the original feed stream that is passed to the reformer-exchanger. It should also be noted that if sufficient oxygen is available for use in the secondary reformer, the size of the direct fired primary reformer can be greatly reduced, with much of the feed gas passing through the primary reformer to the secondary reformer for conversion therein.

The invention is of practical commercial interest, therefore, because of its savings in operating costs and its potential for savings in investment costs particularly for large plants. In the absence of a demand for steam, the invention will enable appreciable savings in operating costs to be realized, the desirable reduction in the waste heat requirements of the invention complementing the significant reduction in fuel consumption achieved by the invention. The steam reforming operations of the invention represent, therefore, a very desirable advance in the reforming art, enhancing the technical and economic feasibility of such operations at a time of increased costs and a growing desire to achieve reductions in fuel consumption and other costs associated with standard commercial operations.

What is claimed is:

1. An improved process for the catalytic steam reforming of fluid hydrocarbons comprising:
    (a) catalytically reacting a major portion of a fluid hydrocarbon feed stream with steam in catalyst-containing reformer tubes positioned within a first primary reforming zone maintained at an elevated temperature by radiant heat transfer and/or by contact with combustion gases, the hot reformer tube effluent comprising a first primary reformed gas mixture;
    (b) passing said first reformed gas mixture from said first primary reforming zone to a secondary reforming zone, for the catalytic reaction therein of unconverted hydrocarbons present in the first primary reformed gas mixture with oxygen or air, the hot effluent from said zone comprising a secondary reformed gas mixture;
    (c) catalytically reacting the remaining portion of said hydrocarbon feed stream with steam at an elevated temperature in a second primary reforming zone having catalyst-containing reformer tubes positioned therein; the hot effluent from said tubes comprising a second primary reformed gas mixture;
    (d) passing said secondary reformed gas mixture to the second primary reforming zone for combining with said second primary reformed gas mixture at the hot discharge end of the reformer tubes of said second primary reforming zone, thus forming a hot combined reformer gas stream within said second primary reforming zone at the hot discharge end of the reformer tubes therein;
    (e) passing the hot combined reformer gas formed within said second primary reforming zone countercurrently on the shell side of said second primary reaction zone, thereby supplying heat to maintain said second primary reforming zone at an elevated temperature; and
    (f) withdrawing the thus-partially cooled combined reformer effluent stream, comprising a combination of said primary and secondary reformed gas mixtures, from said second primary reaction zone, whereby the desired overall steam reforming is accomplished at a substantial reduction in hydrocarbon fuel consumption.

2. The process of claim 1 in which said major portion of the fluid hydrocarbon feed stream comprises at least about two-thirds of said stream.

3. The process of claim 2 in which said major portion comprises from about 70% to about 80% by volume of said fluid feed stream.

4. The process of claim 1 in which said hydrocarbon feed comprises a natural gas stream.

5. The process of claim 1 in which said hydrocarbon feed comprises light naphtha.

6. The process of claim 1 in which said hydrocarbon feed comprises propane and butane.

7. The process of claim 3 in which the mole ratio of steam to hydrocarbon feed in the first primary reforming zone is from about 2/1 to about 4/1, and said mole ratio in the second primary reforming zone is from about 3/1 to about 6/1.

8. The process of claim 7 in which the partially cooled combined reformer gas stream is passed to a waste heat recovery zone for the generation of steam therein.

9. The process of claim 1 and including passing said secondary reformed gas mixture to a waste heat recovery zone, with the partially cooled secondary reformed gas mixture being passed to the second primary reforming zone for combining with said second primary reformed gas mixture at the hot discharge end of the reformer tubes of said second primary reforming zone.

* * * * *